Figure 1:
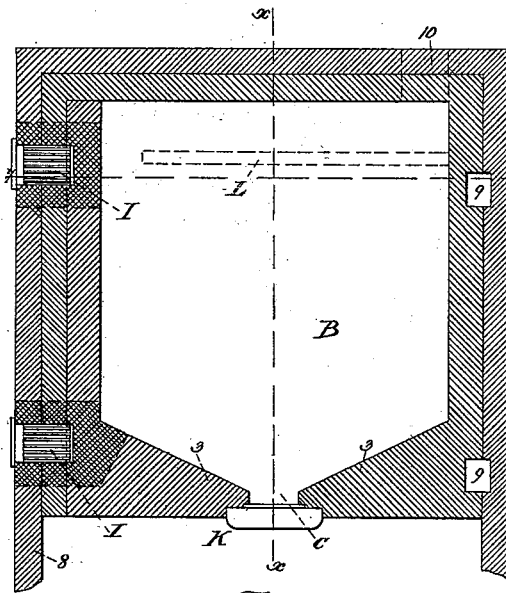

(No Model.)

J. JUNKER.
BAKING OVEN.

No. 349,653.   Patented Sept. 21, 1886.

Witnesses.

Inventor:
Jules Junker by
A. Pollok
his attorney.

UNITED STATES PATENT OFFICE.

JULES JUNKER, OF PHILADELPHIA, PENNSYLVANIA.

BAKING-OVEN.

SPECIFICATION forming part of Letters Patent No. 349,653, dated September 21, 1886.

Application filed April 21, 1885. Serial No. 162,960. (No model.)

*To all whom it may concern:*

Be it known that I, JULES JUNKER, of the city of Philadelphia, State of Pennsylvania, have invented a new and useful Improvement in Baking-Ovens, which improvement is fully set forth in the following specification.

This invention relates more particularly to ovens for baking bread, in which the baking-chamber is heated externally by the circulation of flames or hot gases around the same.

It has for its object, mainly, to secure those conditions of heat and moisture which are best suited to bread-baking.

To this end the crown of the baking-chamber (made of fire-brick or similar refractory material) is inclosed by a thick exterior crown, leaving a space between, with which space the fire-chamber or fire-chambers directly communicate, while the bottom of the baking-chamber is made thick, and is supported above a space through which the products of combustion pass after they have passed over the crown. By this construction the following results are obtained: The crown of the baking-chamber being comparatively thin, and heated directly by the products of combustion, is raised to a high temperature, which is maintained (when it is impossible or undesirable to keep up the fire) by the heat stored in the thick exterior crown, while the bottom, being thick and also heated by the hot gases after they have passed over the crown, is not raised to so high a temperature, and the danger of overheating the bottom is avoided. The bottom, on account of its thickness as well as its exterior crown, stores, during the period of firing, heat, which is expended, it may be, in successive bakings when the fire is not maintained. To the same end the baking-chamber is constructed with a low flat dome arched in all directions, or "turtle-back," as it is termed by masons, for the crown, an inclined bottom or sole sloping upward from the front, and a small door in front. This form of baking-chamber is employed because it diminishes the cubical contents proportionately to the floor-space as much as possible, while giving space for a workman to enter sufficiently to make repairs and to renew the sole. The object in diminishing the cubical contents of the baking-chamber is partly to bring the crown and side walls close to the bread, but principally to enable the steam, which arises from and is limited by the quantity of bread which can be placed on the sole, more completely to fill the chamber. The dome shape brings the crown close to the sole at the edges of the baking-chamber, but furnishes space in the center for the reception of the shoulders of the workman. The inclination of the bottom assists this object, because (for one reason) it recedes from the crown toward the front of the oven, thus giving more space for the entering of the workman without correspondingly increasing the space at the back of the oven. To confine the steam, only one opening is made into the baking-chamber—namely, the door in front—and this is made as small as possible. On either side of the door upright walls extend obliquely to the side walls, so as to cut off the corners, which would not be available for the reception of loaves, because they could not easily be reached through the small door.

It is not new to provide a baking-chamber with an inclined floor, nor to have a small door in front with oblique walls on either side of the same; but a baking-chamber with a dome for the crown (in contradistinction to a substantially flat top or a crown arched in one direction only) and having the bottom inclined is believed to be new. A baking-chamber with a dome for the crown, in combination with a fire-place and smoke-passages for heating the same exteriorly, is also believed to be new. In order to heat the baking-chamber in the most advantageous manner, the exterior crown is arched in the direction in which the products of combustion from the fire-chamber pass, so as to reverberate them upon the crown of the baking-chamber.

The invention further comprises certain special constructions and combinations of parts, as hereinafter set forth.

Figure 2:
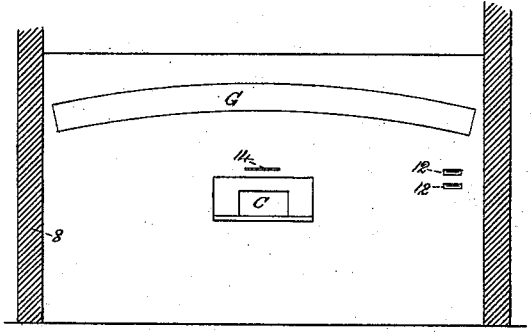
Figure 4:
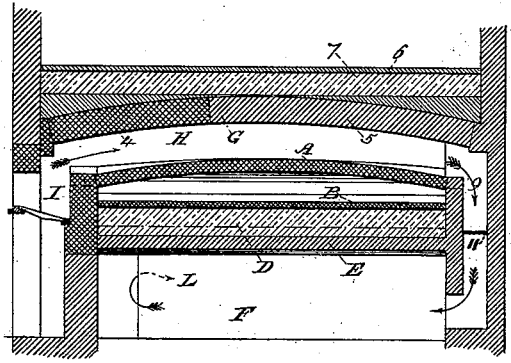
Figure 3:
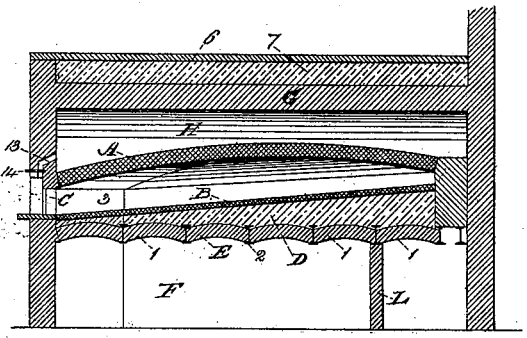

In the accompanying drawings, which form a part of this specification, Figure 1 is a view in horizontal section of an oven constructed in accordance with the invention; Fig. 2, a front view of the same, and Figs. 3 and 4 views in vertical section in planes at right angles to each other on lines $x\ x$ and $y\ y$, Fig. 1, respectively.

A is the crown of the baking-chamber, in the form of a flat dome arched in all directions, supported by the upright side and end walls. The baking-chamber is of about equal depth and width. The crown is made of fire-brick. The floor B of the baking-chamber is of tiles of fire-brick. It is inclined from the front of the oven (in which the contracted opening or small door C is placed) to the rear. (See Fig. 4.) It rests upon a bed, D, of sand, which is upheld by the horizontal partition E, which forms the roof to the heating-space or smoke-chamber F, below the baking-chamber. The tiles, as they simply rest upon the bed of sand, can readily be turned or replaced by others when their surface becomes glazed or otherwise loses its porosity. This partition or roof is composed of small brick arches 1, set between beams 2, of iron. At the front of the oven the walls 3 extend obliquely to the sides of the opening or door C. The lowest part of the oven-floor is therefore at the door; and it is possible, notwithstanding its small dimensions, readily to place the loaves in or to remove them from any part of the baking-chamber. Sufficient room is also left for the entry of the workman, so far as may be necessary to conduct the necessary repairs, while at the same time the cubical contents of the fire-chamber is as small as possible in proportion to the area of the sole available for the reception of loaves.

It will be observed that the crown A, between the center of the baking-chamber and the door, is approximately parallel with the sole, while between the center and the rear, and also between the center and the sides, of the baking-chamber, the crown approaches the sole at a considerable angle.

Above the crown A of the baking-chamber is the exterior arched crown, G, the heating-space or smoke-chamber H being left between the two crowns. The arched crown is supported by the side walls of the oven, thus relieving the inner crown or dome of pressure, except that due to its own weight. The smoke-chamber extending over the inner crown allows a free circulation of the gases. The expense of covering the inner crown with numerous flues is avoided, and at the same time an efficient distribution of the heat is produced. The part 4 of the exterior crown nearest the fire is preferably of fire-brick, while the other parts, 5, are or may be of common red brick. Above the arch, between it and the brick pavement 6, is a filling, 7, of sand. The exterior crown, G, (as well as the bottom B D E of the baking-chamber) is much thicker than the inner crown or dome, A, of the baking-chamber, and serves to store enough heat for several bakings, if it be necessary or desirable to discontinue the fire so long.

The fire-chambers I are built in the brickwork of the oven, and are provided with the usual accessories, such as fire-grate and ash-pit, and the like. The linings are preferably fire-brick or other highly refractory material. The fire-chambers are set in the side wall of the oven, near the front and back corner of the same, and are cut off by the wall 8 from the bake-room K, so that the latter, as well as the baking-chamber, is not likely to be fouled by any ashes, soot, dust, or other dirt from the fire or the fuel. The two heating spaces or smoke-chambers H F are connected in series by the flues 9 in the side wall opposite that in which the fire-chambers are placed. The chamber F is divided by the check-wall L, which extends nearly across the chamber. The space behind the wall is provided with an outlet, 10, (shown in dotted lines, Fig. 1,) which leads to an ordinary chimney or a plate. (Not shown.)

When the fires are kindled in the fire-chamber I, the flames and products of combustion pass over the crown A of the baking-chamber, heat both it and the exterior crown, G, to a high degree, and then pass down through the flues 9 into the space F below the bottom, around the end of the check-wall L, through the space behind it, and thence through the outlet 10. Owing to the thickness of the sand bed D and partition E, and also to the fact that the products of combustion pass first over the crown of the baking-chamber, the floor B is not heated to so high a temperature as the said crown.

In order to regulate the draft, dampers 11 are placed in the flues 9. They can be operated in any suitable way—as, for example, by rods 12, extending to the front of the oven. In order to admit air in regulated quantities to the heating-space or smoke-chamber H, for the purpose of burning therein any combustible gases from the fire-chambers, an opening, 13, is made in the front wall of the oven, and it is provided with a damper, 14.

The fire is regulated in any ordinary or suitable way, and when the oven is heated to the proper temperature the loaves to be baked are placed in the baking-chamber through the door by the usual peel or other suitable means, and distributed over the floor B. The door is then closed, and the fire is kept up or not, as may be desired. The loaves are subjected to the greater heat on top, and in consequence of the great quantity of heat stored in the oven-walls the temperature is perfectly even. The baking-chamber being closed, except for the small opening or door, which also is closed, except for such short times as access to the baking-chamber may render necessary, the vapors emanating from the loaves are confined, and the peculiar atmosphere is produced which imparts to the bread a beautiful color and crust.

Having now fully described my said invention, what I claim is—

1. The baking-chamber arranged above a heating-space or smoke-chamber and having a thick bottom and thin crown, in combination with the thick exterior crown arranged above the baking-chamber, leaving a heating-space or smoke-chamber between the two crowns, and a fire-chamber communicating directly with said last-named space, the two heating-spaces being connected in series, so that the products of combustion pass first over the thin crown and then under the thick bottom of the baking-chamber, substantially as described.

2. The baking-chamber provided with a firebrick crown and with a bottom composed of a tile floor, an underlying bed of sand, and a horizontal supporting partition, said horizontal partition forming the roof of a lower heating-space or smoke-chamber, in combination with the exterior crown arranged above said baking-chamber, leaving an upper heating-space or smoke-chamber between the two crowns, and a fire-chamber delivering its products directly into said upper heating-space, which communicates with and delivers the products into the lower heating-space, substantially as described.

3. A close baking-chamber having the sole sloping upward from the door or opening and provided with a crown in the form of a flat dome, arched from front to rear as well as from side to side, substantially as described.

4. A close baking-chamber, in combination with means for heating the same externally, said chamber having the sole sloping upward from the door or opening and provided with a crown, whereof the part between the middle of the chamber and the door is approximately parallel with the sole, while the part between said middle and the rear of the chamber approaches said sole at a considerable angle, substantially as described.

5. A close baking-chamber having the crown in the form of a flat dome, arched in all directions, in combination with a fire-chamber and communicating smoke-chambers for heating said baking-chamber, substantially as described.

6. The baking-chamber having the bottom composed of the inclined floor, the horizontal supporting-partition, and the filling between the floor and the supporting-partition, in combination with the exterior crown arranged above the baking-chamber, leaving a heating-space or smoke-chamber between, and the fire-chamber communicating with said heating-space, a second heating-space or smoke-chamber of which said partition constitutes the roof, being formed under said baking-chamber, substantially as described.

7. The combination, with the baking-chamber supported above the lower heating-space or smoke-chamber and the exterior crown arranged above the baking-chamber, leaving between them the upper heating-space or smoke-chamber, of the fire-chambers communicating with said upper smoke-chamber, the flues connecting the two heating-spaces or smoke-chambers in series, and the upright check-wall in the lower smoke-chamber, the oven-wall behind said upright check-wall being provided with an outlet for the products of combustion, substantially as described.

8. The baking-chamber having the crown in the form of a flat dome arched in all directions, and provided with a door in the front wall of the oven, the upright walls on either side of said door running obliquely to the side walls of the baking-chamber, in combination with the arched exterior crown spanning said dome, leaving a heating-space or smoke-chamber between, and the fire-chambers in the side wall of the oven communicating with the said heating-space or smoke-chamber, substantially as described.

9. The baking-chamber, of about equal depth and width, having the crown in the form of a flat dome arched in all directions, in combination with the exterior arched crown spanning said dome at a short distance therefrom, and the fire-chambers communicating with the heating-space between the crowns, the curvature of the exterior crown being in the direction in which the products of combustion pass, so as to reverberate them upon the inner crown or dome, substantially as described.

In testimony whereof I have signed this specification in presence of two subscribing witnesses.

JULES JUNKER.

Witnesses:
FREDK. BREITINGER,
R. ROSTHORN.